June 7, 1949.　　　　　M. D. HALL　　　　　2,472,294
HYDRAULIC SYSTEM FOR VEHICLE JACKS
Filed March 7, 1947
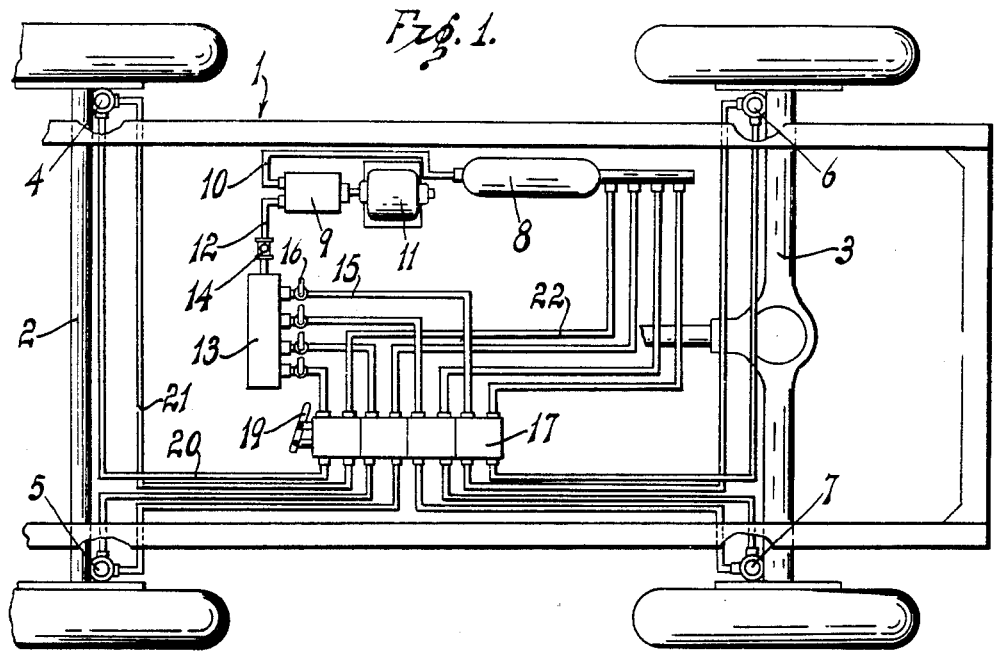
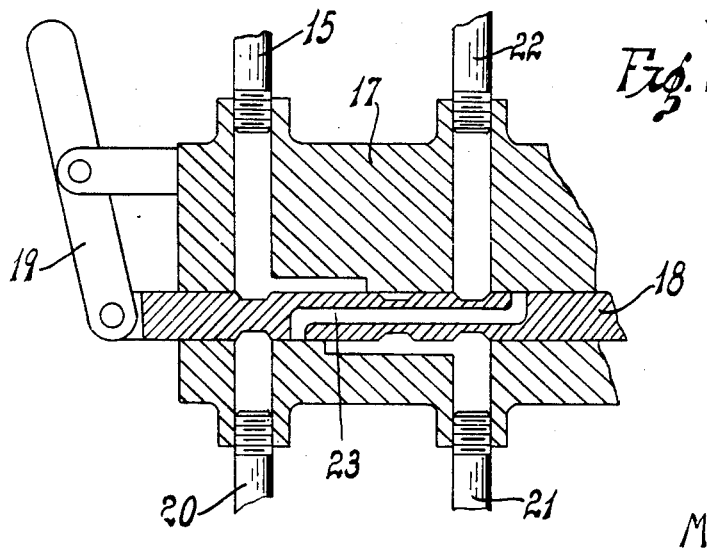
INVENTOR.
Monroe D. Hall.
BY.
ATTORNEY.

Patented June 7, 1949

2,472,294

UNITED STATES PATENT OFFICE 2,472,294

HYDRAULIC SYSTEM FOR VEHICLE JACKS

Monroe D. Hall, Wilmington, Calif.

Application March 7, 1947, Serial No. 733,035

1 Claim. (Cl. 254—86)

This invention relates to a hydraulic system for vehicle jacks whereby a plurality of hoisting jacks attached to a vehicle can be controlled either individually or simultaneously.

An object of my invention is to provide a novel hydraulic system for vehicle jacks whereby the various jacks attached to a vehicle can be quickly and easily controlled from a central point and one or more of the jacks may be extended or collapsed as desired.

Another object is to provide a novel hydraulic system for vehicle jacks which is a self-contained unit and may therefore be installed on any vehicle, with a minimum of effort and labor.

A feature of my invention is to provide a hydraulic system of the character stated in which a valve is provided, controlling either the extending or collapsing movement of the jacks.

Other objects, advantages and features of invention may appear from the accompanying drawing, the subjoined detailed description and the appended claim.

In the drawing:

Figure 1 is a diagrammatic plan view of a vehicle with my hydraulic system mounted thereon.

Figure 2 is a fragmentary longitudinal sectional view of the control valve.

Referring more particularly to the drawing, the numeral 1 indicates a vehicle, including a front axle 2 and a rear axle 3. Attached to the front axle 2 are a pair of hydraulic jacks 4 and 5, which are fixedly attached to the axle and are positioned adjacent the front wheels of the vehicle. Similarly, a pair of jacks 6 and 7 are fixedly attached to the rear axle 3 and are similarly mounted adjacent the rear wheels of the vehicle. All of these hydraulic jacks are usual and well known, and the detail construction of these jacks forms no part of this invention.

The jacks are adapted to be extended or retracted, depending on how the flow of hydraulic fluid is controlled and any or all of these jacks may be extended or retracted as desired by the operator.

A hydraulic fluid reservoir 8 is mounted in a suitable support on the vehicle and a hydraulic pump 9 is connected to the reservoir by the pipe 10, and thus draws fluid into the pump. The pump 9 is suitably driven, preferably by an electric motor 11. The outlet line 12 from the pump 9 extends into a manifold 12. A check valve 14 in this line prevents back flow of fluid from the manifold. Four pressure lines 15 extend from the manifold 13 and a valve 16 is provided in each pressure line, these valves being individually operated and thus admitting pressure into any one of the lines 15. The pressure line 15 extends into a control valve 17 which is formed in four units, one of these units being shown in Figure 2.

A plunger 18 in the control valve 17 is moved in the valve by means of the handle 19. In the position of the plunger shown in Figure 2, pressure is conducted from the pressure line 15 to the down or extending position of the hydraulic jack through the pipe 20. Fluid return from the jack passes through the pipe 21 and thence around the plunger 18 to the return line 22, which extends back to the reservoir 8. If it is desired to retract the jack, the plunger 18 is pulled outwardly and then pressure passes from the line 15 to the up line 21. The return fluid then passes through the line 20 and thence through the drilled port 23 in the plunger 18, and then into the return line 22. It will thus be evident that the control valve 17 can move the jacks either upwardly or downwardly, and any one of the valves 16 can be opened to control any one of the jacks. If the other valves 16 are all closed, only the one jack will operate and this will be self-evident. By opening all of the valves 16, all four jacks will be simultaneously operated.

Having described my invention, I claim:

In a hydraulic system for vehicle jacks, the combination of a plurality of jacks fixedly attached to a vehicle, a hydraulic pump, a reservoir connected to said pump, a pressure line extending from the pump, a manifold into which the pressure line extends, a control valve, a plurality of lines extending from the manifold, each of the lines extending to the control valve, a manually actuated valve in each of said lines extending from the manifold, a manually operable plunger in the control valve, lines extending from the control valve to the up and down side of each of the jacks, said plunger being adjustable to direct fluid to either the up or down side of the jacks, and return lines extending from the control valve to the reservoir.

MONROE D. HALL.

REFERENCES CITED

The following references are of record in the file of this patent:

UNITED STATES PATENTS

| Number | Name | Date |
|---|---|---|
| 1,580,318 | Nordenskjold | Apr. 13, 1926 |
| 1,995,241 | Chavez et al. | Mar. 19, 1935 |
| 2,056,954 | Bryant | Oct. 13, 1936 |

FOREIGN PATENTS

| Number | Country | Date |
|---|---|---|
| 290,620 | Italy | Nov. 24, 1931 |
| 625,003 | France | Apr. 16, 1927 |